June 23, 1953 — J. F. MORSE — 2,643,146
END CONNECTION FOR PUSH-PULL CABLES
Filed Sept. 18, 1950
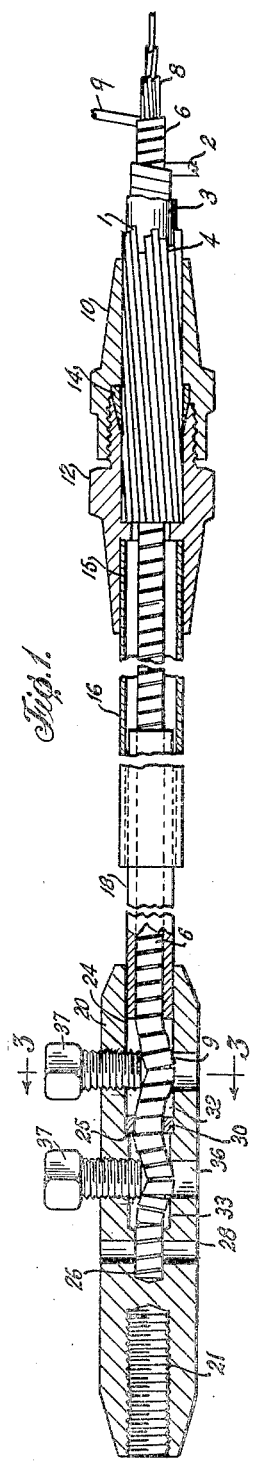
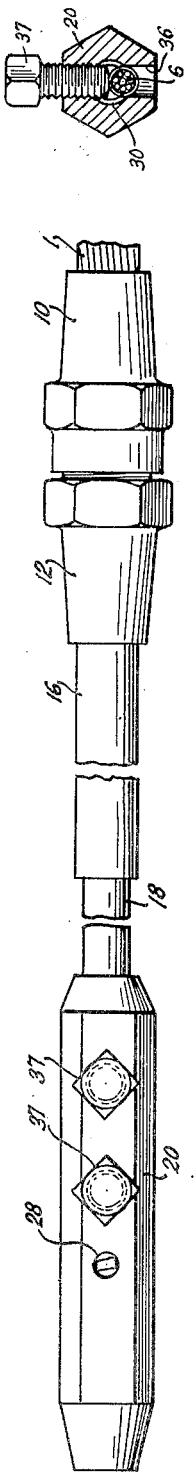
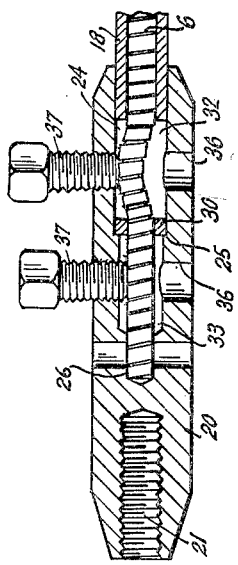
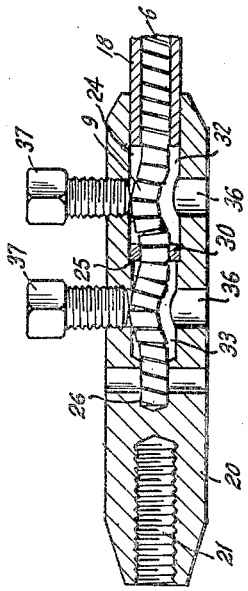
INVENTOR.
JOHN F. MORSE
BY
Ely & Frye
ATTORNEYS Patented June 23, 1953

2,643,146

UNITED STATES PATENT OFFICE 2,643,146

END CONNECTION FOR PUSH-PULL CABLES

John F. Morse, Hudson, Ohio

Application September 18, 1950, Serial No. 185,420

9 Claims. (Cl. 287—119)

1

The present invention relates to improvements in push-pull cables which are characterized by the provision of a flexible wire or cable for the transmission of mechanical motion in either direction. Cables of this type are well known and usually consist of a flexible casing or conduit, within which slides a core member, usually in the form of a cable, designed to carry both tension and compression loads which are imparted to it.

The present invention is for the purpose of providing a new and novel manner of attaching an operative fitting to the end of the movable element or core of the push-pull cable assembly with the view to making a firm, non-slipping connection between the cable and the fitting, at either end of the cable. It is also an object of the invention to provide a connection between the fitting and the cable which will admit of disassembly of the fitting from the cable so as to facilitate easy repair or replacement of the cable.

It is one of the prime objects of the invention to provide a fitting which may be readily assembled with the cable by the use of ordinary tools so that the cable may be cut and fitted with the necessary end fittings at the point of use. Prior to the activities of the present inventor, push-pull cables and fittings were completed as a factory operation, which was a great inconvenience because the assemblies had to be manufactured to order. By the design of fittings which can be readily assembled on location, it is possible for a mechanic to cut and fit lengths of cable on the job. It was also one of the objections to prior forms of push-pull cable assemblies that the end fittings were made as permanent attachments to the cable member and hence it was very difficult to make any changes or adjustments in the cable assembly after it was received and before it was installed in place. Likewise, it was practically impossible to disassemble the installation for replacement or repair.

While the invention may be adapted to various forms of push-pull cables, it is primarily intended and adapted for use with a push-pull cable of the so-called high efficiency type which consists of an inner core composed of a nineteen wire cable of alternate lays, around which is wrapped a flat metal ribbon which is swaged down to size, thus compacting the spiral ribbon around the cable. This swaging action causes the metal of the ribbon to flow into the interstices between the outer wires of the cable, locking the ribbon in place. The outer flat ribbon provides a smooth outer core surface which in-

2 sures the free movement of the core in the flexible outer casing.

The invention will be described as applied to the type of push-pull cable described, although in some aspects thereof it is not confined to that type of core member.

The invention is disclosed in detail in the drawings and the description, but it will be understood that it is subject to modification or improvement within the scope of the claims which set out the invention.

In the drawings,

Fig. 1 is an assembly view of the complete end fitting, parts thereof being shown in section on the line 1—1 of Fig. 2.

Fig. 2 is a view looking at the top of the fitting as shown in Fig. 1.

Fig. 3 is a section on the line 3—3 of Fig. 1.

Fig. 4 is a view showing the first operations in the disassembly of the fitting and the cable or core.

Fig. 5 is a view showing a second operation in the disassembly.

Referring to the drawings, the cable assembly comprises an outer casing which is secured to the building or other structure by clamps or the like not shown. The outer casing is flexible so that it may be fitted to the location and bent about any obstructions or angles. It is indicated as a whole by the numeral 1 and may be of any well known design. That shown in the drawings, however, is a special type of casing, covered in copending application of this applicant, Serial No. 188,809, filed October 6, 1950. The casing consists of a flat, spirally wound metal wire or ribbon 2, forming a smooth inner surface over which the cable proper may slide, a waterproof covering 3, usually made of braided textile material impregnated and coated with some water proofing substance, and an outer sheath or armor formed of a wire wrapping 4 wound on a long angle so that the casing is flexible.

The cable proper as a whole is given the reference numeral 6. It is in the form described above and comprises the inner core member 8 of the nineteen wire cable construction and the outer wrapping of flat metal ribbon 9 is applied as described, the core assembly constituting an armored strand, which is common in the art. It will be noted that the outer wire ribbon has sharp edges along the sides of each turn of the wrapping and this feature of the cable proper is availed of to insure a tight, non-slipping connection with the end fitting. Any distortion of the cable will expose the sharp edges of the wrapping, which will grip into the fitting in the manner shown in Fig. 1 and to be explained more fully later on.

When the push-pull cable assembly is to be installed, the mechanic cuts off a length of the casing sufficient for the installation, so as to leave a substantial length of the cable proper or core 6 projecting from either end of the casing. Having secured the casing in place, he places the mating threaded thimbles 10 and 12 over the casing with the compressible clamp ring 14 in position between the thimbles so that as the thimbles are tightened the casing fitting will be firmly clamped into the end of the casing.

The member 12 is provided with a socket 15 in which is force-fitted an outer rigid guiding tube 16, which extends for a substantial distance so that the end fitting will be guided in its movement with the core member. The inner diameter of the guiding tube 16 is somewhat larger than the core member, and telescopically received in the tube is a second smaller sleeve 18 which fits more closely over the core member 6 and serves as a guiding extension for the end fitting so that any axial movement of the fitting moves the core member through the casing. The telescoping sleeve and tube are cut away in the drawings to reduce the overall length of Fig. 1, but they should be of sufficient extent to insure the smooth operation of the cable proper in its movement in the casing.

The end fitting which is intended for either end of the cable installation, is indicated as a whole by the numeral 20 and is adapted to be secured to the operating member or to the element to be moved by the cable. It may be of any suitable form, that shown being a relatively heavy hexagonal bar of sufficient length and provided with a threaded socket 21 for attachment to the operative element. This may be a simple threaded socket, as shown, or in clevis form, ball and socket connection, or any other type of connection.

In the other end of the fitting 20 is drilled the deep socket 24 which for some distance is of the same diameter as the outer diameter of the sleeve 18, which is force fitted and brazed, or otherwise secured in the end of the socket. At some distance from the mouth of the socket 24, the bore thereof is reduced to provide a circumferential shoulder or abutment 25 and at its extreme inner end the socket is still further reduced to a diameter slightly greater than the core to provide a seat 26 for the extreme outer end of the core 6. At this part of the fitting a sight hole 28 is provided, intersecting the bore so that the operator can see that the end of the core is "home" in the fitting before completing the installation.

Located at the base of the outer portion of the socket 24 is a ring 30, the inner diameter of which is slightly larger than the external diameter of the core 6. This ring is pressed into place against the shoulder 25 and may be furnace brazed to assure that it is permanently located.

It will be seen that there are thus provided within the fitting two chambers 32 and 33 of substantially the same size and considerable length, and with an internal diameter greater than the external diameter of the core member 6. These may, for convenience, be designated as displacement chambers because they allow the core member to be displaced for the purpose of locking the core and the end fitting together.

Through approximately the center of each chamber 32 or 33 there is provided a transverse bore 36, one side of which bears against the portion of the cable proper which is in alignment therewith.

As shown more particularly in Fig. 1, when the two set screws are threaded into the end fitting, the end of each screw will force the core member 6 into a deep bend or kink, and as the screw is turned down to its inner limit, one side of the core member will be forced into one of the holes 36.

It will be observed that not only will the core member be held in the fitting by the two bends forced therein, but the outer armor formed by the flat metal ribbon 9 will materially increase the interlock between the core and the end fitting. As the core is distorted, the spiral turns of the ribbon 9 are displaced and spread apart, which exposes the sharp edges of the ribbon. As the pressure is increased by driving the screws into position, these sharp edges will bite into whatever metal they contact. This will be around the edges of the holes 36, around the edges of the hole in the ring 30, on the ends of the screw, and on the exposed end of the sleeve 18. It is impossible to withdraw the core from the end fitting after the core is thus deformed and even should the screws 37 loosen, the deformation of the core and the numerous bites between the core and parts with which it is in contact will hold the core firmly in the end fitting.

It is one of the stated objects of the invention to provide for the ready release of the end fitting in case it becomes necessary to replace, repair, or service the push-pull cable. This cannot be done by merely backing off the screws and it is for the releasing operation that the enlarged chambers 32 and 33 are especially useful.

To disconnect the core and the end fitting, the first operation is to back off the screws 37 until the ends of the screws have withdrawn to a point beyond the perimeter of the chambers. The operator now twists the cable proper and the end fitting relatively so that the humps in the core are 180° from their former position and in alignment with the ends of the screws. If necessary, a blunt tool inserted in the holes 36 will free the core from any interlock with the edges of the holes. This condition is shown in Fig. 4. He now readvances the screws 37 so that the pressure exerted on the core will straighten out the core which is held between the sleeves 18, the ring 30, and the reduced bore 26. In Fig. 5, one of the humps has been removed and the other is about to be removed. The core is now straightened out sufficiently so that the outer wrapping 6 is sufficiently smooth so that when the screws 37 are again backed off the fitting the sleeve 18 may be withdrawn over the core.

It will be seen that a secure and non-slipping interlock has been provided between the core and the end fitting, to which result the construction of the cable proper has materially contributed. It will also be seen that a construction has been devised which permits of the comparatively easy disassembly of the core and the end fitting. While the double screws 37 and the two chambers are preferred, the invention is not to be considered as restricted to more than one chamber and screw 37. Beneficial results will be achieved with the use of a single chamber and a single screw 37. Screws 37 are preferred as the thrust members movable into the chamber for deforming the core.

What is claimed is:

1. An end fitting for the core of a push-pull cable, said fitting having an axial bore of greater internal diameter than the external diameter of the core, a ring in the bore sub-dividing the bore into two chambers, said bore having an inner reduced extension, said core being receivable in the bore and supported at the end by the reduced extension of the bore and at a midway point by the ring, means at the entrance to the bore to support the core centrally of the bore, and pressure screws threaded in one side of the fitting and adapted to enter the chambers and bear against one side of the core to distort the core and force it against the opposite walls of the chambers.

2. An end fitting for the core of a push-pull cable, said fitting having an axial bore of greater internal diameter than the external diameter of the core, a ring in the bore sub-dividing the bore into two chambers, said bore having an inner reduced extension, said core being receivable in the bore and supported at the end by the reduced extension of the bore and at a midway point by the ring, means at the entrance of the bore to support the core centrally of the bore, and pressure screws threaded in one side of the fitting and adapted to enter the chambers and bear against one side of the core to distort the core and force it against the opposite walls of the chambers, said core being rotatable in the fitting to present the opposite side of the core to the pressure screws.

3. An end fitting for the core of a push-pull cable, said fitting having an axial bore of greater internal diameter than the external diameter of the core, said bore having a reduced extension, a partition dividing said axial bore into two chambers, the core being receivable in the chambers with its end seated in the reduced extension and supported at a midway point by the partition, means at the entrance of the bore to support the core centrally of the bore, transverse holes in the fitting leading to the chambers, and pressure members movable through the holes to contact one side of the core and distort it until the opposite side of the core is forced against the opposite wall of the chambers.

4. An end fitting for the core of a push-pull cable, said fitting having an axial bore of greater internal diameter than the external diameter of the core, said bore having a reduced extension, a partition dividing said axial bore into two chambers, the core being receivable in the chambers with its end seated in the reduced extension and supported at a midway point by the partition, means at the entrance of the bore to support the core centrally of the bore, transverse holes in the fitting leading to the chambers, and pressure members movable through the holes to contact one side of the core and distort it until the opposite side of the core is forced against the opposite wall of the chambers, said core being rotatable in the fitting to present the other side of the core to the pressure members.

5. The combination of the core of a push-pull cable, said core having an outer covering of a spirally wrapped flat metal ribbon, and a fitting for the end of the core, said fitting having an internal chamber of greater diameter than the external diameter of the core, two spaced means in the chamber to support the core centrally of the chamber, and a pressure device entering one side of the chamber between said spaced means and adapted to bear upon one side of the core between the supports and distort the core to expose the edges of the ribbon and force the ribbon against the opposite side of the chamber.

6. A device in accordance with claim 5 in which the pressure device is a screw threaded in one end of a passage extending transversely through the fitting.

7. The combination of the core of a push-pull cable, said core having an outer covering of a spirally wrapped flat metal ribbon, a fitting for the end of the core, said fitting having an internal chamber of substantially greater diameter than the diameter of the core, two spaced means in the chamber to support the core in a central position in the chamber, a transverse passage in the fitting intersecting the chamber, and pressure means entering one side of the transverse passage adapted to bear upon the core and distort it to expose the edges of the ribbon and force the core with the exposed edges of the ribbon into the other side of the transverse passage.

8. The combination of the core of a push-pull cable, said core having an outer covering of a spirally wrapped flat metal ribbon, a fitting for the end of the core, said fitting having an internal chamber of substantially greater diameter than the diameter of the core, means at the ends of the chamber to support the core in a central position in the chamber and at a midway point between said supporting means, transverse passages in the fitting intersecting the chamber between the core supports, and pressure means in said passages, said pressure means adapted to bear upon the core from one side and distort it and expose the edges of the ribbon and force the core with the exposed edges of the ribbon into the passages on the opposite side of the chamber.

9. The combination of the core of a push-pull cable, said core having an outer covering of a spirally wrapped flat metal ribbon, a fitting for the end of the core, said fitting having an internal chamber of substantially greater cross sectional area than the cross sectional area of the core, two spaced means in the chamber to support the core in spaced relation to one side of the chamber, a transverse passage in the fitting intersecting the chamber between the core supports and a pressure device in one side of the passage adapted to bear against the core to distort the core and expose the edges of the ribbon and force the core with the exposed edges of the ribbon into the other side of the passage.

JOHN F. MORSE.

References Cited in the file of this patent

UNITED STATES PATENTS

| Number | Name | Date |
|---|---|---|
| 270,478 | Pumphrey | Jan. 9, 1883 |
| 721,411 | Alexander | Feb. 24, 1903 |

FOREIGN PATENTS

| Number | Country | Date |
|---|---|---|
| 193,415 | Switzerland | Jan. 3, 1938 |
| 257,455 | Italy | Mar. 3, 1928 |
| 461,055 | Great Britain | Feb. 9, 1937 |